United States Patent
Gaither et al.

(10) Patent No.: US 10,460,024 B2
(45) Date of Patent: Oct. 29, 2019

(54) INTERACTIVE ELECTRONIC FORM WORKFLOW ASSISTANT THAT GUIDES INTERACTIONS WITH ELECTRONIC FORMS IN A CONVERSATIONAL MANNER

(71) Applicant: Adobe Inc., San Jose, CA (US)

(72) Inventors: Shawn Gaither, Raleigh, NC (US); Richard Treitman, Lexington, MA (US); David Parmenter, Newton, MA (US); Arian Behzadi, San Francisco, CA (US); Kyeung sub Yeom, San Mateo, CA (US); James Alisago, Felton, CA (US); Frederic Thevenet, San Francisco, CA (US); Andres Gonzalez, Wake Forest, NC (US); Anatole Matveief, SanJose, CA (US)

(73) Assignee: Adobe Inc., San Jose, CA (US)

( * ) Notice: Subject to any disclaimer, the term of this patent is extended or adjusted under 35 U.S.C. 154(b) by 702 days.

(21) Appl. No.: 14/988,293

(22) Filed: Jan. 5, 2016

(65) Prior Publication Data
US 2017/0192950 A1    Jul. 6, 2017

(51) Int. Cl.
*G06F 3/0484* (2013.01)
*G06F 17/24* (2006.01)
(Continued)

(52) U.S. Cl.
CPC .......... *G06F 17/243* (2013.01); *G06F 3/0484* (2013.01); *G06F 9/453* (2018.02); *G10L 15/22* (2013.01); *G06F 3/167* (2013.01)

(58) Field of Classification Search
CPC ...... G06F 17/243; G06F 9/4446; G06F 3/167; G06F 3/0484; G10L 15/22
See application file for complete search history.

(56) References Cited

U.S. PATENT DOCUMENTS

| | | | |
|---|---|---|---|
| 7,814,431 B1 * | 10/2010 | Quinn | G06F 3/0237 715/751 |
| 2006/0064302 A1 * | 3/2006 | Ativanichayaphong | G06F 17/243 704/235 |

(Continued)

OTHER PUBLICATIONS

Bui, Trung and Martin Rajman, Rapid Dialoge Prototyping Methodology. [online] EPFL Technical Report IC/2004/01, Jan. 5, 2004 [retrieved on Dec. 10, 2015]. Retrieved from the Internet: <URL: http://liawww.epfl.ch/Publications/Archive/Bui2004.pdf>, 17 pages.

(Continued)

*Primary Examiner* — Anil K Bhargava
(74) *Attorney, Agent, or Firm* — Kilpatrick Townsend & Stockton LLP

(57) ABSTRACT

Techniques for assisting users electronic forms. One exemplary technique involves initiating a workflow assistant based on user input of the user or a predetermined triggering event to prompt the user to complete the electronic form. The workflow assistant downloads or obtains the electronic form based on a user response and identifies a workflow based on the electronic form. The workflow identifies a sequence of user interactions to complete the electronic form. Identifying the workflow includes developing, based on fields in the electronic form, requests for content of fields from the user and possible predicted answer choices for the content of each of the fields. The workflow assistant then executes the workflow to conduct the user interactions to obtain the content for the fields of the electronic form to complete the electronic form.

20 Claims, 7 Drawing Sheets

(51) Int. Cl.
  *G06F 9/451* (2018.01)
  *G10L 15/22* (2006.01)
  *G06F 3/16* (2006.01)

(56) References Cited

U.S. PATENT DOCUMENTS

| | | | |
|---|---|---|---|
| 2006/0074652 A1* | 4/2006 | Ativanichayaphong | G06F 17/243 704/235 |
| 2008/0215976 A1* | 9/2008 | Bierner | G06F 17/243 715/708 |
| 2009/0204881 A1* | 8/2009 | Murthy | G06F 17/243 715/226 |
| 2010/0211863 A1* | 8/2010 | Jones | G06F 17/243 715/224 |
| 2011/0015929 A1* | 1/2011 | Fantin | G06F 3/0219 704/260 |
| 2013/0041243 A1* | 2/2013 | Byrd | G06T 19/003 600/374 |
| 2013/0198628 A1* | 8/2013 | Ethier | G06F 3/0484 715/709 |
| 2013/0212521 A1* | 8/2013 | Fedoseyeva | G06Q 10/00 715/781 |
| 2014/0033011 A1* | 1/2014 | Wandeler | G06F 17/243 715/222 |
| 2014/0208194 A1* | 7/2014 | O'Leary | G06F 17/243 715/222 |
| 2015/0227194 A1* | 8/2015 | Kubota | G06F 3/167 345/156 |
| 2016/0085317 A1* | 3/2016 | Agarwal | G06F 3/03 345/156 |
| 2017/0075701 A1* | 3/2017 | Ricci | H04W 4/21 |
| 2017/0132191 A1* | 5/2017 | Ringuette | G06F 17/243 |
| 2017/0372699 A1* | 12/2017 | Bakshi | G06F 16/3329 |

OTHER PUBLICATIONS

Olympus. [online]. CMU Speech Lab, Feb. 12, 2015 [retrieved on Dec. 10, 2015]. Retrieved from the Internet: <URL: http://wiki.speech.cs.cmu.edu/olympus/index.php/Olympus>, 3 pages.

* cited by examiner

INTERACTIVE ELECTRONIC FORM WORKFLOW ASSISTANT THAT GUIDES INTERACTIONS WITH ELECTRONIC FORMS IN A CONVERSATIONAL MANNER

TECHNICAL FIELD

This disclosure relates generally to techniques for assisting users with the use of electronic forms on electronic devices.

BACKGROUND

Users commonly use computing devices to receive, store, fill out, and export electronic forms. In one example, a user receives an email including a link to an electronic form. By clicking on the link, the electronic form is downloaded from a website to the user's computing device and the user saves it locally on the computing device. Thereafter, the user uses an application on the computing device to fill out the electronic form. Generally, filling out the electronic form involves operating another application hosted on the computing device to display the electronic form at a graphical user interface. The user is able to view the form and input data to the fields of the form via the application. The user then also uses the same or a different application to export the electronic form, for example, printing the electronic form, emailing the electronic form to a recipient, or uploading the electronic form to a server.

Generally, the interactions necessary for users to use electronic forms (e.g., receiving, downloading, fill out, emailing, etc.) require the user to proactively operate multiple applications and are only suited for users with significant visual, manual, and cognative abilities who are attempting to use the electronic form on an appropriate device in an appropriate circumstance. More specifically, applications for interacting with electronic forms are typically passive in the sense that an active request of the user is needed prior to any interaction. For example, a personal assistant application running on a smartphone requires the user to identify the electronic form and request the download. Moreover, the process of interacting with the various applications to receive, fill out, and export a form can be quite complex and is often particularly challenging for users having disabilities or impairments, such as users with visual impairments, manual impairments, or cognative disabilities. Similarly, using electronic forms can be challenging in certain user circumstances for any user, for example, when a user is driving or otherwise using his or her hands for another task. In addition, the interactions with the various applications to receive, fill out, and export forms are difficult or impossible to perform using electronic devices that have limited capabilities, such as devices with small screens and devices that lack keyboards and/or mouse input devices such as mobile phones, tablets, and many gaming devices.

SUMMARY

One exemplary embodiment involves assisting a user with completing an electronic form. The embodiment involves initiating a workflow assistant based on user input of the user or a predetermined triggering event to prompt the user to complete the electronic form. The workflow assistant downloads or obtains the electronic form based on a user response from the user and identifies a workflow based on the electronic form. The workflow identifies a sequence of user interactions to complete the electronic form. Identifying the workflow includes the workflow assistant developing, based on fields in the electronic form, requests for content of fields from the user and possible predicted answer choices for the content of each of the fields. The possible predicted answer choices are developed based on a user profile, user circumstances of the user, or information about other users that the workflow assistant obtained. The workflow assistant then executes the workflow to conduct the user interactions to obtain the content for the fields of the electronic form to complete the electronic form. In one example, a workflow assistant guides user interactions to select an electronic form to populate, populate fields of the electronic form by iteratively querying and receiving responses for the fields according to the workflow, and export the electronic form, for example, printing, saving, or e-mailing the electronic form. The modality of the user interactions (e.g., visual or audible requests and key-based, touch-based, and/or verbal responses) is also selected to facilitate assisting the user with using the electronic form in a manner that is best suited for the user, device, and/or circumstances.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
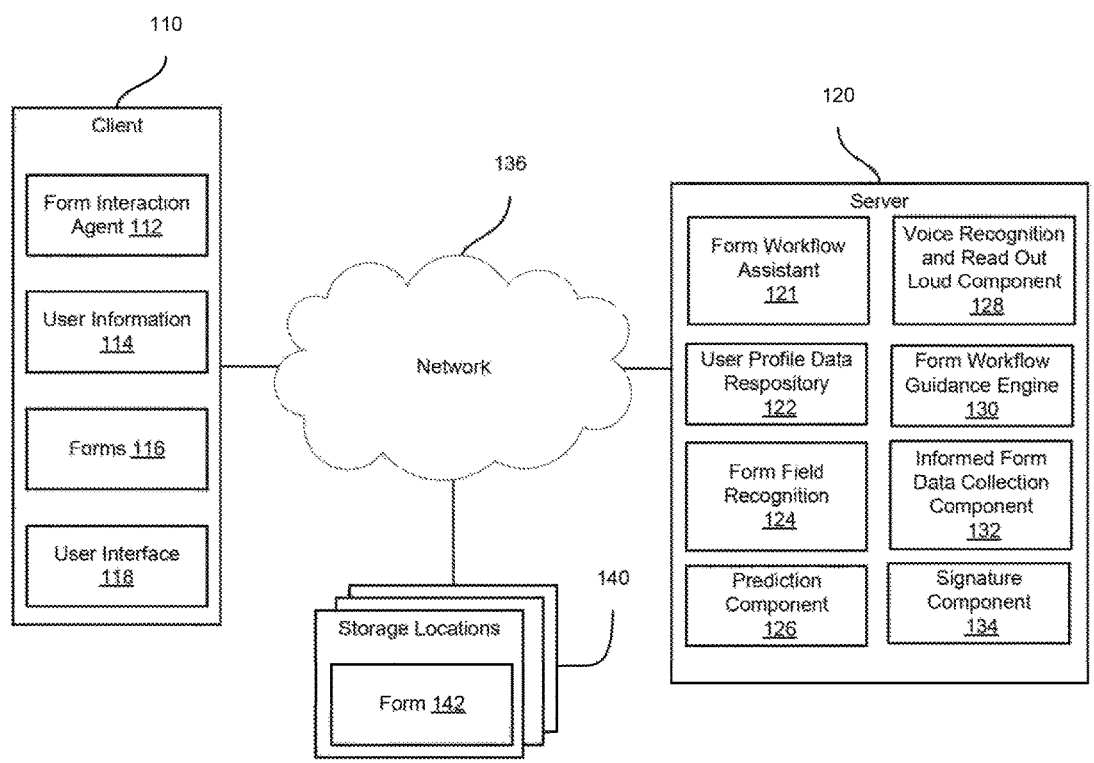
FIG. 1 illustrates an example of a computing environment for assisting with use of an electronic form according to certain embodiments of the present invention.

Specific details of various exemplary embodiments of the present invention are set forth in the following description and are illustrated in the figures. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

As discussed above, existing techniques for using electronic forms (e.g., receiving, downloading, filling out, emailing, etc) require the user to proactively operate multiple applications and are only suited for users with significant visual, manual, and cognative abilities attempting to use the electronic form on an appropriate device in an appropriate circumstance. Generally, the embodiments described herein are directed to, among other things, assisting users to use an electronic form so that more users, including users with impairments, can use forms using devices with fewer features, including using smart phones, tablets, and other small touch screen devices, and in more circumstances, such as while driving or performing other tasks that occupy the hands. In one embodiment, a workflow assistant is initiated, obtains an electronic form, and assists a user with completing the electronic form by guiding interactions in a conversational manner. This is accomplished by identifying, creating, and/or supplementing a workflow that includes a sequence of user interactions to complete the electronic form. Form field recognition is used to determine requests for information to complete the fields of the form. For example, if form field recognition detects that a field is for a first name of the person of the user, a request that asks the user to enter or select a first name from a list of options is provided. The options are identified based on a user profile. For example, first name options "Rob" and "Robert" are identified for one user based on identifying that the user profile for that user has a legal name "Robert" and a nickname "Rob." Based on identifying requests and possible predicted answer choices, the technique guides user interactions according to the form workflow by iteratively requesting user interactions using the requests and the possible predicted answer choices.

The techniques disclosed herein solve numerous computer-specific problems with prior computing systems that were used to receive, populate, and export electronic forms. By using a workflow assistant that obtains a form, identifies a workflow for the form, determines requests based on field recognition for the workflow, and predicts response options based on user profile information, user circumstances, or information for other users, the technique is able to facilitate selection, population, and/or exporting of an electronic form better than prior techniques. The technique guides users with cognitive impairments, for example, to use applications using multiple applications and having complicated form-filling instructions that many users would otherwise be unable to use. Similarly, by predicting user responses (e.g., content options to populate a particular field, network location options to export a form, etc.) and presenting those possible predicted answer choices to the user as recommendations or options, the user's task is further simplified. In one embodiment, the technique creates and implements an end-to-end workflow for selecting a form, completing the form, and exporting the form.

The modality of the guided interaction also allows the technique to solve problems of prior systems. In one embodiment, audio output is used to provide requests that guide user interactions. The requests can simplify complicated form instructions, provide suggestions regarding how a form should be used, when it should be completed, to whom it should be sent, etc. By providing the requests using audio output, use of the form is made accessible to users with visual impairments, users with devices lacking sufficient screen size, and users who prefer audio generally or in specific circumstances, such as while driving. Similarly, responses from users can be received in a manner that best suits the user. In one embodiment, user responses are verbal and voice recognition is used to translate the responses into text. This is useful, for example, to users with visual impairments, users with devices lacking a keyboard, mouse, and or other appropriate input mechanism, users with devices having keyboards that obscure a large portion of the screen during use of the keyboard (i.e., pop-up touch screen keyboards), users with manual impairments, and users who prefer to provide verbal responses generally or in specific circumstances, such as while exercising.

One embodiment combines components to provide a comprehensive solution for assisting users with electronic forms. These components include a user profile data repository, a form field recognition component, a response prediction component, a workflow assistant, an informed form data collection engine, a simple client user interface for small devices, and a voice recognition and read out loud component. By combining these components, an end-to-end user experience is enabled without requiring visual, manual, cognitive, and device capabilities that were required by prior techniques. Moreover, the user's experience can be simplified, for example, involving simple selection of options without typing. The user's experience can be completely hands free.

As used herein, the phrase "electronic form" refers to an electronic document for completion by someone filling out the electronic document with information that is expected to be put at specific places on the electronic document. A portable document format (PDF) document with such specific information places is an example of an electronic form. A scanned image of the PDF document is also an example of an electronic form. Typically, an electronic form includes a template of fields and additional information added by one or more persons completing the electronic form. An electronic form will generally provide a way for the persons entering information to enter information in a consistent way so that a receiver of multiple instances of the completed form can read or extract information at particular locations on the electronic form and understand, based on the location, the information. Similarly, the use of fields at particular locations on electronic forms facilitates the interpretation of information entered onto the forms. An electronic form may, for example, have a name field and an analysis application may understand, based on the location of the text added to the electronic form by a person completing the electronic form, that the added text is the name of the person. The template of an electronic form can specify fields and field characteristics.

As used herein, the phrase "field" refers to a location in an electronic form or a portion of a form at which one or more items of information are entered when the electronic form is completed. Text boxes, Boolean graphics such as checkboxes, and signatures are examples of fields. A field has one or more field characteristics. Fields can be defined explicitly and identified expressly, for example, using metadata in the form. Fields that are not defined can be inferred, for example, using a recognition algorithm that uses appearance of certain graphical objects (lines, rectangles, circle, radio buttons, checkboxes, etc.) to identify locations as candidate fields where information is to be entered when the form is completed.

As used herein, the phrase "user" refers to a person.

As used herein, the phrase "user interaction" refers to displaying, audibly playing, or otherwise presenting content to a user or receiving input from a user in the form of input on a keyboard, touch screen, mouse, microphone, or other input device. Exemplary user interactions include, but are not limited to, displaying text or graphic messages, displaying sign language, playing computer generated audio messages, receiving typed messages, receiving voice input, receiving video or photo input, or receiving input from a scanner, such a biometric scanner.

As used herein, the phrase "conversational manner" refers to back and forth user interactions between an application sending requests and a user replying or otherwise providing responses. Examples of conversations involve displayed text messages, audio messages, video messages, and user text, touch, verbal, signed, body language, or other responses captured or otherwise received by the computer device in response to the request messages.

As used herein, the phrase "workflow assistant" refers to a computer-implemented component or process that downloads or obtains electronic forms and that identifies, creates, supplements, or executes a workflow to complete user interactions to select, complete, export, or otherwise use the electronic forms. A workflow assistant is provided on a server and accessed by a client device in one embodiment. In another embodiment, a workflow assistant is provided locally on a client device that the user uses to complete or otherwise use an electronic form.

As used herein, the phrase "workflow" refers to a sequence of user interactions to select, complete, and/or export an electronic form. An example of a workflow involves a user providing input to confirm that a recommended electronic form should be completed, a series of requests and user responses used to obtain information to populate the fields of the form, and a user providing input to confirm that the completed electronic form should be exported in a recommended manner, for example, to automatically upload the electronic form to the third party from whom the electronic form was received by the user.

As used herein, the phrase "form field recognition" refers to a computer-implemented process that receives an electronic form representing the form as an image or other structured or unstructured format and interprets the spacing, words, lines, shapes, and other attributes or metadata of the form to identify fields on the form.

As used herein, the phrase "predetermined triggering event" refers to a user-initiated, rime initiated, or occurrence-initiated event that was previously identified to trigger an action. Examples of predetermined triggering events include, but are not limited to, receipt of a particular user request, an identified due date or time occurring, and a receipt of a reminder or message, for example, from a third party such as a form providing service.

As used herein, the phrase "possible predicted answer choices" refers to potential content or selections for a particular field of a form and/or a particular user. For example, possible predicted answer choices for a name field include names of a user completing the form that are identified from a user profile of the user. In another example, the possible predicted answer choices for a gender field are predicted from answers that other users provided to complete gender fields in the same or another form.

As used herein, the phrase "modality" refers to a mode of providing output and/or receiving input on a device. Examples of output modalities include, but are not limited to, general modalities such as visual display or audio presentation modalities, and more specific modalities such as text based, menu-based, and question-based modalities. Examples of input modalities include, but are not limited to touch-based, physical keyboard-based, mouse-based, trackball based, Braille-based, hand gesture based, video recognition-based, eye gaze-based, switch control-based, and electroencephalogram (EEG) analysis-based modalities.

Turning to FIG. 1, that figure illustrates an example computing environment for assisting with use of an electronic form via a computing device. As illustrated, a client 110 is in communication with a server 120 over a network 136 to receive guidance about interactions with electronic forms. The electronic forms can be of different types and can be available from different storage locations 140. Although a client-server architecture is shown, the embodiments are not limited to a distributed implementation. Instead, the embodiments similarly apply to implementations where the various techniques are locally hosted and executed at the client 110.

The client 110 represents a computing device that a user operates to access and interact with electronic forms. For example, the user operates the client 110 to import, select, populate, and export electronic forms. The server 120 represents a computing system that proactively guides and otherwise assists the user's accessibility to, and interactions with, the electronic forms. The client 110 and/or server 120 access the electronic forms from the source 140.

The form workflow assistant 121 utilizes the functionality of the other components 122-134 to provide assistance to a user using a form. Specifically the form workflow assistant 121 proactively sends requests to the user according to a workflow from the form workflow guidance engine 130, which determined the workflow using the user profile data repository 122 and prediction component 126. The form workflow assistant 121 also uses the informed form data collection component 132 to compose requests that include possible predicted answer choices (based on the form field recognition component 124) and uses the voice recognition and read out loud component 128 to formulate audible requests and to interpret voice-based responses. The form workflow assistant 121 uses the signature component 134 to insert electronic signatures into forms. The use of one or more of these components together to provide assistance to users using forms provider significant advantages over prior systems and, in certain circumstances, guides the user through an end-to-end workflow such that users with impairments, users using smaller devices, and/or users using devices in restricting circumstances (e.g., while driving) are enabled to perform tasks with forms that they otherwise would not be able to complete.

The form workflow assistant 121 anticipates potential interactions of the user with an electronic form and causes the client 110 to present requests to solicit user responses. In one example the form workflow assistant 130 guides the user to select, download, obtain, populate, and export an electronic form. This can involve determining an appropriate workflow based on a particular form and a set of input requests to receive appropriate instructions and information from the user to complete and export the electronic form. In turn, the client 110 presents the input requests to the user using different input/output modalities, such as ones using text, graphical options, voice based presentations, or touch presentations via Braille machines. In an example, the input requests are presented in lieu of the electronic form selecting, downloading, obtaining, populating, and/or exporting the electronic form. The presentation of each input request is a guided presentation in the sense that guidance to the user is provided to solicit the appropriate use response. For example, an input request corresponds to a field of the electronic form, and is based on a label of the field and text describing the field. The guided presentation of this input request is based on the label and/or the text and requests a user response. User responses to the presentation of the input requests are receded at the client 110 and provided to the form workflow assistant 121 on the server 120. The form workflow assistant 121 uses the responses to initiate actions (e.g., providing an appropriate form, uploading a form, populating a field, etc.) For example, form workflow assistant 121 populates the fields of the electronic form with data from the user responses and saves the filled out electronic form.

The network 136 represents a data network that includes, for example, a public network (e.g., the Internet) and/or a private network (e.g., an intranet). The storage locations 140 represent different spaces where electronic forms 142 reside. Some of the storage spaces are accessible to the client 110 and/or the server 120 over the network 136. For example, such storage spaces include a server hosting an email inbox of the user, a server hosting a website, and a network-based storage space (e.g., public or private cloud storage). Other storage spaces are local to the client 110 and/or the server 120. For example, disk of the client 110 and/or the server 120 can be part of the storage location 140.

Turning to the other computing components of the server 120, these components include, for example, user profile data repository 132, form field recognition 124, prediction component 126, voice recognition and read out loud component 128, form workflow guidance engine 130, informed data collection component 132, and signature component 134.

The user profile data repository 122 stores user information such as the user's name, address, occupation, gender, age, and numerous other pieces of information potentially useful in populating form fields as well as user preference information (e.g., preferring the interact with forms via a touch free modality), and information about the user's past interactions with forms. User information can be stored for a particular user or for a plurality of users and can be specific to a particular electronic form or generic to a plurality of electronic forms. In other words, the information is stored for one-to-one, one-to-many, many-to-one, and many-to-many associations between users and electronic forms. In an example, the user information for a particular user includes user personal information, user preferences, and information about resources associated with the user. The user information is collected from one or more sources.

The form field recognition component 124 retrieves an electronic form 142 from the source 140 and locally stores the retrieved electronic form for analysis. The form field recognition component 124 analyzes the electronic form 142 to identify fields within the electronic form 142. These fields can be explicit when the electronic form 142 has a structure. In an illustration, if the electronic form 142 is a portable document format (PDF) form, the layout of such form encapsulates the different explicit fields. The form field recognition component 124 detects the fields from the layout. These fields can also be implicit when the electronic form 142 does not have a structure. For example, if the electronic form 142 is a scanned image, the form field recognition component 124 applies optical character recognition (OCR) and pattern recognition techniques to detect the implicit fields. Once the fields are identified, the form field recognition component 124 also identifies the label, field type (e.g., text, checkbox, radio button, signature), and the text describing each field from the electronic form 142 as applicable.

The prediction component 126 predicts suggested user interactions with an electronic form based on an electronic form state (available to the user, already downloaded, active, inactive, partially populated, having particular field populated, validated, exported, etc.), user information from the user profile data repository 124, user circumstances, information about other users such as other user actions and other user responses to populate similar fields, and/or information about the particular electronic form, such as an associated submission deadline and submission upload parameters. Note that the prediction component 126 could also be used to aid in the prediction of values for fields based on field values from a prior form used by the user and/or other users.

The voice recognition and read out loud component 128 performs voice recognition on audible responses, translating the sound waves into text and, conversely, translating text requests into audible audio signals for playback on client device 110. Voice recognition could be designed to select from a series of constrained responses (e.g., male, female; 1, 2, 3) in addition to a "free-form" mode where responses are taken literally in an unverified manner.

The form workflow guidance engine 130 identifies user interactions to provide a workflow for completing a desired use of a form. For example, the workflow, in one example, involves selecting the form for download and use, populating the form with information based on user interactions, and guiding the user to upload the form to an appropriate location. The workflow guidance engine uses the form field recognition 124 to identify the fields of the forms and determine appropriate requests to obtain content to populate the fields from the user. Generally, an input request corresponding to a field is formulated based on the label of the field and an instruction describing how to populate the field. Different mapping types between fields and input requests can be used. For example a one-to-one mapping is available, where each field is mapped to one input request. In an illustration, a field for a date of birth and a field for a Social Security number are mapped to an input request for the date of birth and an input request for the Social Security number, respectively. A many-to-one mapping is also available, where multiple fields are mapped to one input request. In this mapping, a group of fields are mapped to a single input request based on a degree of associations between the fields of the group. In an illustration, a field for a first name and a field for a last name are mapped to an input request for a full name. The form analysis tool 122 saves the input requests as the reformulated form 126.

The informed data collection component 132 predicts potential responses from a user with respect to populating particular fields of the electronic form and uses those possible predicted answer choices to formulate easy-to-use requests for user interactions. For example, the informed data collection component 132 will predict that the user will use a first name or nickname stored in the user profile data repository 122 to predict that the user's response to a request for information to populate a first name field will be one of those two names. In another example response options for a gender field (i.e., male of female) are identified from responses by other users to gender fields in the same form or other forms. The predicted values can then be used as candidate responses to the voice recognition component 128 so that it may be operated in a mode constrained to only the candidate responses.

The signature component 134 facilitates user interactions that allow a representation of the user's signature to be inserted into a form. In one example, the signature component 134 receives biometric information from the user, such as a user thumbprint or an audio print of the user's voice, validates the identity of the user based on the biometric information, and inserts an electronic signature.

Turning to the computing components of the client 110, these components include, for example, a form interaction agent 112, user information 114, electronic forms 116, and a user interface 118. Some or all of these components interface with some or all of the components of the server 120 to guide the user's interactions with electronic forms.

The form interaction agent 112 is an application or function that allows the user to input the user information 114 and to interact with electronic forms. Generally, the form interaction agent 112 presents requests to guide interaction with an electronic form, receives responses of the user to the presentation, and provides the user responses to the server 120. As such, the form interaction agent 112 allows the user to import, download, select, populate, validate, and export an electronic form following a step-by-step guided interaction that provides the user with suggested responses, assistance navigating within the form, and using a non-text user interface modality if desired.

The user information 114 includes some or all of the user information from the user profile data repository 122 about the particular user. In an example, the user information 114 is entered by the user via the form interaction agent 112. In another example, the user information 114 is received from the server 120.

The electronic forms 116 represent local copies of electronic forms. User interactions can use the local copies. However, the interactions can also use electronic forms stored at the storage location 140 or on server 120.

The user interface 118 represents an interface for presenting the guided interaction. The presentation uses different input and output modalities. The user interface 118 includes, for example, a graphical user interface. The guided interaction involves a back and forth guided dialog via the graphical user interface. In another example, the user interface 118 includes an audio interface. In this example, the guided interaction uses an audio presentation to inform the user about the electronic form and accepts speech response from the user.

The embodiments described herein are not limited to the client-server architecture illustrated in FIG. 1. For example, some or all of the functionalities of the server 120 can be pushed to the client 110. Other variations of the distributed architecture between the client 110 and the server 120 are also possible and should be apparent to one of ordinary skill in the art in light of the embodiments described herein.

Figure 2:
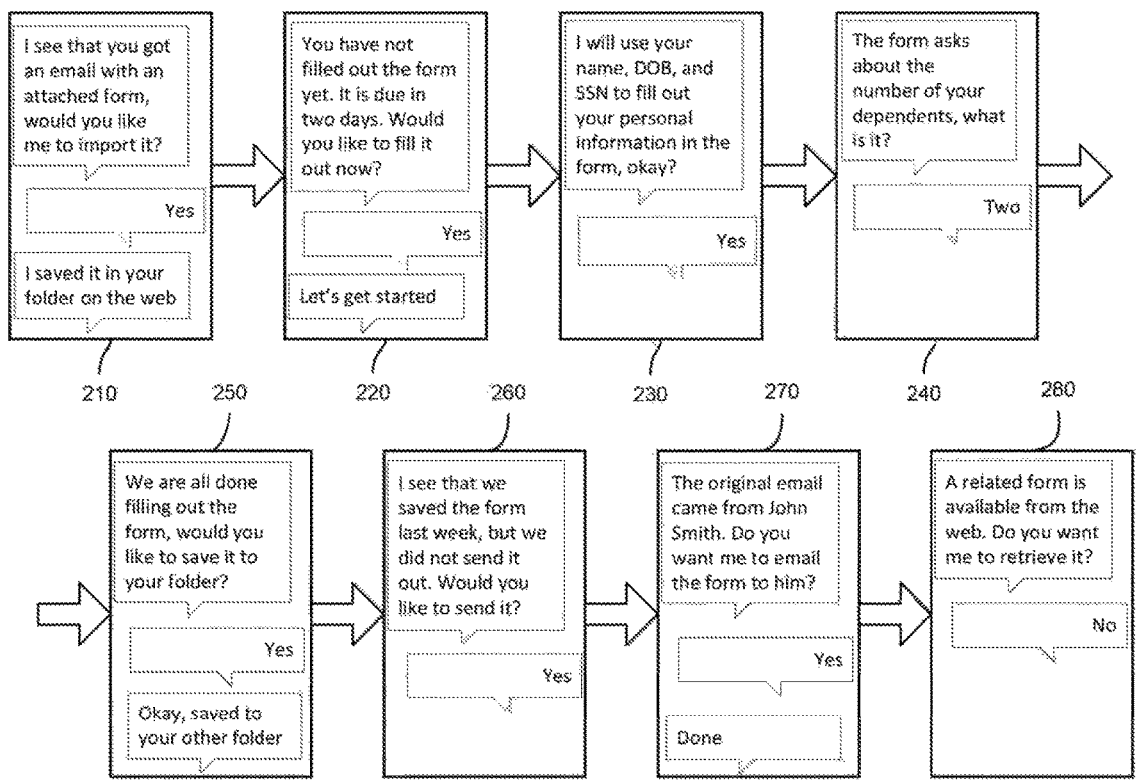
FIG. 2 illustrates an example interactive and guided dialog to assist a user using an electronic form, according to certain embodiments of the present invention.

Turning to FIG. 2, the figure illustrates a guided presentation displayed at a client to assist a user with an electronic form. As displayed, the guided presentation includes input requests to solicit user responses. A user inputs the user responses to the guided presentation at the client 110. The displayed input requests and inputted user responses represent a guided dialog. In the interest of clarity of explanation, a form workflow assistant is described in connection with facilitating the guided dialog at a user interface of the client. The user interface implements an input/output modality in the form of a text messenger. However, other computing components and input/output modalities can be additionally, or alternatively, used. In one embodiment, for example, voice requests and audible responses are used so that a hands free process is enabled.

As part of a first guided interaction 210, the application detects that a user received an email with an attached electronic form. If state information indicates that the electronic form has not been imported yet, the application enters an import state. Accordingly, the guided interaction 210 proactively asks the user whether he or she would like to import the electronic form. If so, the electronic form is imported by, for example, copying the electronic form from the email to a folder of the user on a network-based storage space.

A second set of guided interactions includes guided interactions 220-250 and corresponds to the fill out state. In particular, the application determines that the electronic form has been imported, but has not been filled out. Based on an anticipated interest of the user in filling out the form, the guided interaction proactively asks the user whether he or she would like to fill out the application. If so, the process of filling out the application form is initiated. A step-by-step approach is used to enhance the user experience.

For example, the application identifies personal user information based on the user information. The guided presentation 230 asks the user whether this information should be used. If so, the application prepopulates respective fields of the electronic form with the personal user information.

In a next step, the application identifies a field of the electronic form that needs input of the user. As such, the guided interaction 240 describes this field to the user and solicits the user's input. The application utilizes the user response to populate the field.

When the various fields of the application have been filled out, the application determines that the filling out process is complete. The guided interaction 250 informs the user of the completion and asks whether the electronic form should be saved. If so, the application saves the electronic form to another folder of the user. The application proactively identifies this folder from the user information. Additionally or alternatively, the application implements an auto-save mode. If so, the electronic form is auto-saved.

Once saved, the application sets the state of the electronic form to, for example, fill out complete/export incomplete. After some time elapses, the application detects that the electronic form has not been exported yet. Accordingly, a third set of guided interactions 260 and 270 is provided.

The guided interaction 260 explains the application was saved, but has not been sent out despite the elapsed time. The guided interaction 260 also asks the user whether the export should be performed. If so, the application initiates the export process. In this example, the export includes sending the form to an email address.

The application proactively determines the email address. For example, the application uses the same email address of the sender of the original email or having scanned this original email for email addresses mentioned in the "to" or "cc" fields in the email header, or the contents of its body. The guided interaction 270 explains to the user how the email address was determined and asks the user if that is the proper email address. If so, the application attaches the electronic form to a new email and sends the new email to the sender.

In addition, the application predicts that the user has an interest in a second electronic form related to the first electronic form (e.g., the one that was sent). For example, the application determines that the sender had also emailed another electronic form that has not been imported, filled out, or exported yet. Once the second electronic form is identified and based on the state of this electronic form, the application proactively provides guidance to the user. As such, the application can also predict an interest in a particular electronic form based on interactions with other electronic forms. As illustrated in FIG. 2, if the second electronic form has not been downloaded yet, the application sets the state to import. Accordingly, a guided interaction 280 is proactively provided to the user to ask whether the import should occur.

Hence, the application proactively informs the user about an electronic form and solicits a user response to move the electronic form to a next state. At each state, the application ascertains as much information as possible about the electronic form and the user's interest to interact with the electronic form. Accordingly, the application guides the user in an interactive, simplified manner that improves the user experience and the accessibility to and interactions with the electronic form.

Figure 3:
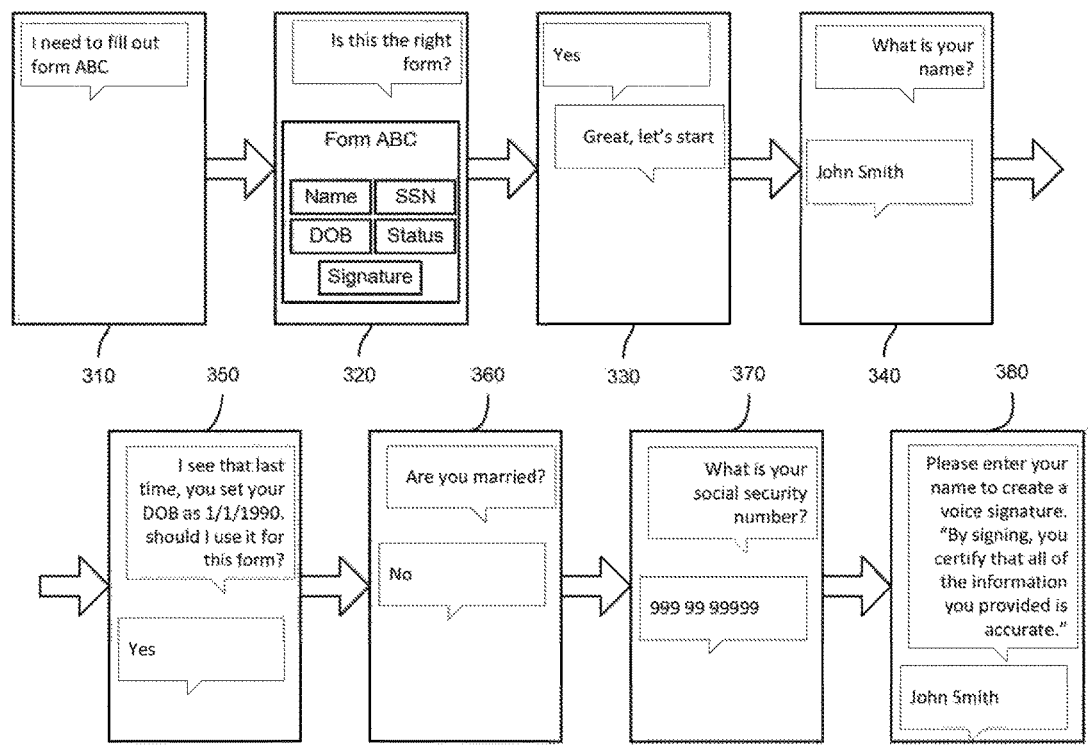
FIG. 3 illustrates another interactive and guided presentation to assist a user using an electronic form.

Turning to FIG. 3, the figure illustrates another interactive and guided presentation to assist a user using an electronic form. As displayed, the guided presentation includes input requests to solicit user responses. A user inputs the user responses to the guided presentation at the client 110. The displayed input requests and inputted user responses represent a guided dialog. The user interface implements an input/output modality in the form of a text messenger. However, other computing components and input/output modalities can be additionally, or alternatively, used. In one embodiment, for example, voice requests and audible responses are used so that a hands free process is enabled. In addition, the illustrated electronic form includes five fields: a name field, a Social Security number field, a date of birth field, a status field, and a signature field. However, another number and type of fields can also be used.

In a first interaction 310, a request to fill out the electronic form is received from the user. For example, the user may make the request on client device 110 and the request sent to the server 120 where it is interpreted by the form workflow assistant 121. The form workflow assistant 121 identifies and accesses the electronic form. In response and as a part 320 of the guided presentation, the form workflow assistant 121 provides a message with a graphical representation of the electronic form, such as a thumbnail representing the electronic form and a name representing the identification of the form, and sends a message asking the user whether the right electronic form was accessed. The user response confirms. In turn and as a part 330 of the guided presentation, the form workflow assistant 121 provides a message explaining that the fill out process will start.

Corresponding to the first field of the electronic form (e.g., the name field), the next interaction asks the user to input his or her first name, as a part 340 of the guided presentation. The received response is analyzed and used to populate the name field. Once that field is populated, the guided presentation proceeds to the next field corresponding to the date of birth. As illustrated, the user previously provided the date of birth in connection with filling out a different electronic form. A prediction is made that the same date of birth can be used for the current electronic form. Accordingly, and as a part 350 of the guided presentation, the form workflow assistant 121 provides a message explaining to the user that the date of birth was predicted and requests a confirmation of the user. Upon a confirmation of the user, the date of birth field is populated and the guided presentation proceeds to the next field corresponding to the status.

Here, the electronic form includes two options for filling out the status field. A first option of being married. A second option of being unmarried. As a part 360 of the guided presentation, the form presentation tool asks the user if he or she is married. The answer is no. Accordingly, the second option (unmarried) is automatically selected to populate the status field. In this example, the electronic form includes contingent instructions for a user, stating that "If unmarried, skip questions 14 and 15, and proceed to section 2 of the form." The form workflow assistant 121 accordingly recognizes the form navigation and, given the user's response the user is unmarried, automatically skips questions 14 and 15, and proceeds to a section of the electronic form to continue the guided presentation. In one example, this navigation is based on a workflow identified by form workflow guidance engine 130 that identifies user interactions for completing the electronic form according to potential user responses and based on interpretation of instructions in the electronic form.

As a part 370 of the guided presentation, after skipping to section 2 of the electronic form, the form workflow assistant 121 sends a message asking the user for his or her Social Security number. If the user responds with a text answer, that answer is invalidated because a numeric answer is expected. The user is then asked again for the Social Security number. If the user responds with a numeric answer, the Social Security number field is populated with the different numbers (or, the last four digitals of the Social Security number are only used rather for security reasons and personal privacy). The guided presentation proceeds to the last field. This last field is a signature field and is associated with a legal disclaimer.

As a part 380 of the guided presentation, the form presentation tool reads the legal disclaimer and asks the user to enter his or her name as a form of the signature. The entered name is used to populate this last field. In an alternative embodiment, the user is asked to provide biometric authentication such as a thumbprint that is used to retrieve an authenticated electronic signature for the user for insertion into the electronic form. The electronic form is then automatically saved to complete the fill-out process.

In comparison, existing techniques typically display the electronic form to the user and provide no guidance for populating each field. Instead, it is left to the user to navigate through the fields. This navigation can become cumbersome or impossible when the user interface is small in size and/or when the user has some impairment. Alternatively, the guided presentation of the embodiments described herein presents an input request corresponding to a field and guides the user to provide an input. Such a guided presentation improves the accessibility to the electronic form via the client even when the user interface is small and when the user has some impairment.

In one embodiment, providing a guided presentation, such the guided presentations of FIGS. 2 and 3, involves using a workflow identified by a form workflow guidance engine 130. The workflow identifies user interactions for completing the electronic form according to desired objectives, user preferences, user profile information, potential user responses, interpretation of instructions in the electronic form, and other appropriate information. The workflow, in one embodiment, maps the electronic form to a state machine. In one example, each part of the guided presentation is presented based on the state machine and based on the user response to the previous part of the guided presentation. A form assistant, such as form workflow assistant 121, that provides the guided interactions is located on the client device 110, on the remote server 120, on both, or otherwise provided to implement the guided interactions according to the workflow.

The guided interactions of FIGS. 2 and 3 are illustrative. Other guided interactions are also possible. For example, upon a download of an electronic form from a source, a blank version of the electronic form is saved locally to the application. Future uses of the electronic form can be based on the local version. In another example, an electronic form is saved with a populated portion that can be reused over time (e.g., the portion containing personal user information such as a name). Future uses of the electronic form would include the pre-populated portion such that the user interaction with the electronic term is reduced.

Figure 4:
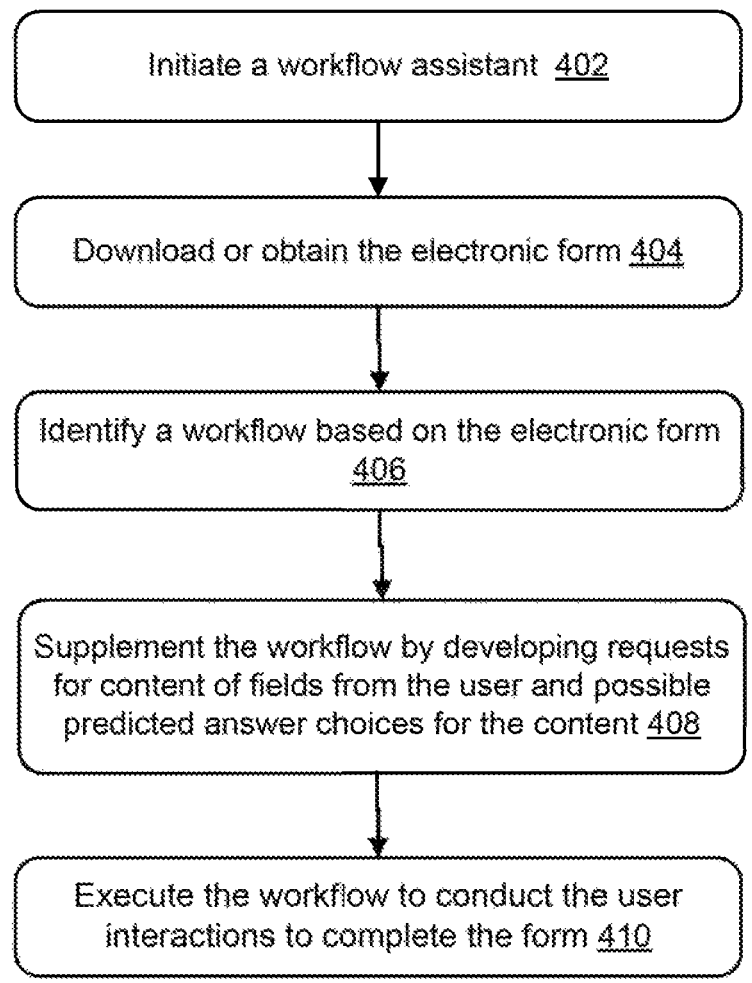
FIG. 4 is a flow chart illustrating an exemplary technique for assisting a user with an electronic form.
Figure 5:
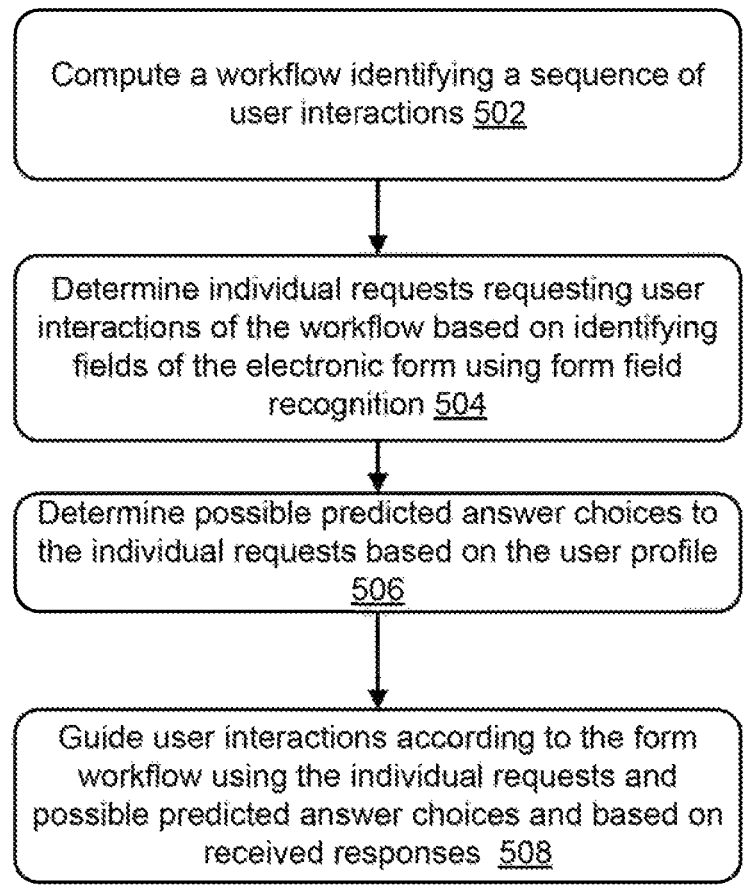
FIG. 5 is flow chart illustrating an exemplary technique for assisting a user with use of an electronic form by guiding user interactions in a conversational manner.
Figure 6:
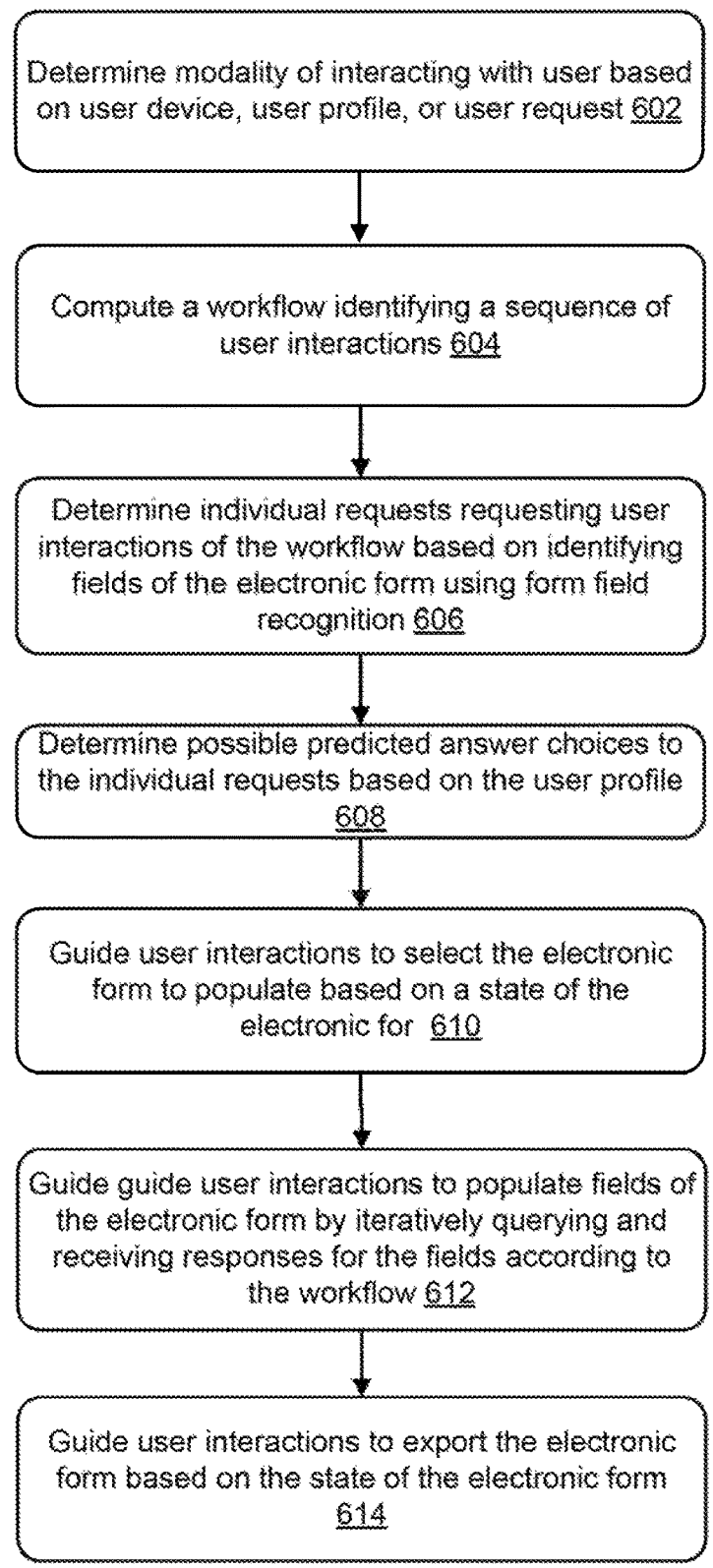
FIG. 6 is flow chart illustrating an exemplary technique for assisting a user with use of an electronic form by guiding user interactions in a conversational manner.

Turning to FIG. 4-6, the figures illustrate example techniques for assisting a user with use of an electronic form. In the illustrative operations, each of the operations or functions may be embodied in, and fully or partially automated by, modules executed by one or more processors of a computing system. An example computing system is further illustrated in FIG. 7. In the interest of clarity of explanation, the computing system is described as performing the illustrative operations. Nevertheless, one of ordinary skill in the art would appreciate that the computing system can execute one more modules, such as a form analysis tool, a form workflow assistant, and/or other modules, to implement one or more of the operations and/or one or more steps of the operations. Additionally, while the operations are illustrated in a particular order, it should be understood that no particular order is necessary and that one or more operations can be omitted, skipped, and/or reordered.

FIG. 4 is a flow chart illustrating an exemplary technique for assisting a user with an electronic form.

The technique of FIG. 4 involves initiating a workflow assistant, as shown in block 402. The workflow assistant is initiated based on user input in one embodiment. An example of this is a user selecting to launch a form workflow application on a mobile device. Another example, is a user providing a voice command to initiate the workflow assistant. The workflow assistant is initiated based on a predetermined triggering event to prompt the user to complete the electronic form in another embodiment. In one example, a workflow assistant tracks upcoming due dates associated with one or more forms and the workflow assistant is initiated a predetermined time, for example, one day or one week prior to the due date.

The technique of FIG. 4 further involves downloading or obtaining, by the workflow assistant, the electronic form, as shown in block 404. Obtaining the form involves retrieving the form from local storage. The downloading or obtaining of the form is based on a user response from the user in one embodiment. In a specific example, the form workflow assistant asks the user if the user would like to download and complete a particular form at the present time and the user responds affirmatively to this request. Based on the affirmative response to the request, the workflow assistant downloads or obtains the form.

The workflow assistant then identities a workflow based on the electronic form, as shown in block 406. The workflow involves a sequence of user interactions to complete the electronic form. In one example, the workflow identifies fields to complete in the electronic form. In another example, the workflow identifies a flow of requests that are contingent upon user responses used to populate particular fields of the form. For example, the workflow will identify that certain fields or sections are to be skipped in certain circumstanced such as the user providing a negative response regarding having dependents and skipping the dependent information fields based on the negative response.

The technique of FIG. 4 further involves the workflow assistant supplementing the workflow by developing requests for content of fields from the user and possible predicted answer choices for the content of each of the fields, as shown in block 408. In one embodiment, the requests for content of fields are developed based on fields in the electronic form. As a specific example, this involves identifying fields of the electronic form using form field recognition. In one embodiment, the possible predicted answer choices are developed based on a user profile, user circumstances of the user, or information about other users that the workflow assistant obtained. Developing the possible predicted answer choices involves identifying one or more user characteristic in the user profile corresponding to an identified field of the electronic form in an embodiment of the invention. For example, possible predicted answer choices identifying the user's last five addresses from a user profile are identified as possible predicted answer choices for an address field. In another example, possible predicted answer choices are identified based on answers for the same or similar fields by other users. Such other user answers are used, for example, to identify possible predicted answer choices for a hair color and eye color fields.

The form workflow assistant next executes the workflow to conduct the user interactions to complete the electronic form, as shown in block 410. In one embodiment executing the workflow involves concluding the user interactions to obtain the content for the fields of tire electronic form from responses received from the user. Such responses are touch-based, text-based, voice-based, and/or provided through any other appropriate input modality. In one embodiment, executing the workflow to conduct the user interaction to obtain the content for the fields involves guiding user interactions according to the workflow to populate the fields of the electronic form by iteratively requesting user interactions using the requests for content and the possible predicted answer choices and receiving responses to the requests.

In addition to assisting a user complete an electronic form, the form workflow assistant assists the user with selecting and exporting the electronic form in some instances. The form workflow assistant identifies multiple forms for a user to select from in one example. The form workflow assistant guiding the user to select a form to complete is based on a state of the electronic form in one embodiment. For example, if the electronic form state is incomplete and a form deadline is approaching, the form workflow assistant automatically prompts the user asking whether the user would like to complete the form now given the incomplete state of the form and the approaching form deadline. The workflow assistant guiding the user to export the electronic form is based on the state of the electronic form indicating that the form is completed or based on other user circumstances. Exporting the electronic form includes, but is not limited to, printing, electronic sharing, saving, messaging, providing a notification, or e-mailing the electronic form.

FIG. 5 is flow chart illustrating an exemplary technique for assisting a user with use of an electronic form by guiding user interactions in a conversational manner.

The technique of FIG. 5 involves computing a workflow identifying a sequence of user interactions, as shown in block 502. The sequence of user interactions is designed to assist the user with selecting, populating, exporting, or otherwise using the electronic form. The sequence of user interactions is based on an identified use or uses of the form. For example, if the use of the form relates to assisting the user with selecting an appropriate form to complete, the user interactions are automatically determined to guide the user through the selection of the form. This can involve identifying one or more options of electronic forms for possible selection, and designing the user interactions of the workflow to facilitate the user's selection from the options. Similarly, if the use of the electronic form involves completing the electronic form by a completion deadline, the sequence of user interactions of the workflow is based on the deadline, for example, the sequence could involve reminders and scheduled messages to initiate completion of the form prior to the deadline.

In addition to, or as part of, computing the workflow identifying the sequence of user interactions, the technique of FIG. 5 further involves determining individual requests requesting user interactions of the workflow based on identifying fields of the electronic form using form field recognition, as shown in block 504. The sequence of user interactions of the workflow determined by the technique is designed to assist with population of those fields in one embodiment. This can involve identifying fields and the types, labels, and texts describing the fields. The identification depends on whether the electronic form is structured or unstructured. If structured, the computing system identifies the fields from the structure of the electronic form. Otherwise, the computing system implements OCR and pattern recognition techniques for the identification. In an example, the computing system analyzes the electronic form to detect text, lines, and images. Patterns of vertical, horizontal, and curved lines are further detected. These patterns are matched to fields and types of fields. In an illustration, intersections between horizontal and vertical lines along with text within the intersection area represent a text field. A circular pattern of lines represent a radio field. A long horizontal line with short intersecting vertical lines represent a comb field. In addition, the computing system determines the location of the detected text relative to the fields. Text that is closer to a particular field relative to other fields is associated with the particular field and is set as the descriptive text. Further, the computing system analyzes the text associated with each field to identify a label of the field. For instance, this identification uses the location of the text relative to the field and the length of the text. Short text that is the closest to the field or that is within the field is set as the label.

Identifying the sequence of interactions and determining individual requests also involves identifying the flow of the electronic form in one embodiment. In this embodiment, input requests are generated in one-to-one or many-to-one mappings of fields to input requests. One-to-one mappings can be used as a default. However, many-to-one mappings can also be used to group related fields (e.g., ones belonging to a same section, having common subject matter, being of the same type, sharing descriptive text, etc.) in a single input request. The many-to-one mapping can ease the effort of the user in providing an input because the user needs to provide only one user response that is then parsed and used to populate multiple fields. For instance, the user's address includes a number, street, city, state, and zip code. A one-to-many mapping allows the user to provide his or her full address at once. That address is then parsed to detect the number, street, city, state, and zip code and accordingly populate the fields of the electronic form. In one embodiment, each input request is set as a state of a state machine and transitions between the states are set depending on the flow and depending on user responses. An improper user response results in no transition. A proper user response results in a transition to another state.

In an example, the sequence of user interactions is designed to request input in a way that is organized according to the flow of the corresponding fields in the electronic form. For example, within a same section of the electronic form, the input requests follow the flow of the corresponding fields. If a first field is listed before a second field, a transition is set from the respective first input request to the respective input request. On the other hand, if a first field can be followed by two fields depending on the input to the first field (e.g., the first field is a status field such that, if married, the first field is followed by a number of dependent fields and otherwise, the next field is an occupation field), transitions from the respective first input request to the respective two input requests are set and are followed depending on the user response. Across two sections of the electronic fields, transitions are set between input requests corresponding to adjoining fields and/or inter-dependent fields across the two sections. In one embodiment, an override mode is set for using a state machine such that, if the user requests to populate a particular field, a transition to an input request corresponding to that particular field is set regardless of the current state of the state machine, thereby providing an override.

In one embodiment generating the input requests uses a one-to-one and/or a many-to-one mapping between fields and input requests. The mapping depends on a degree of association between the fields. In other words, two or more fields are mapped to a same input request if such fields have a particular association. Otherwise, the fields are mapped to different input requests. The computing system uses various parameters to measure the degree of association between fields. These parameters include whether the fields belong to a same section, have a common subject matter, are of the same type, and/or share descriptive text. In an illustration, two fields that belong to a personal information section, ask for a first name and last name, necessitate text input, and have descriptive text about user personal information are found to be associated at a high degree. Accordingly, the computing system maps these two fields to a same input request, such as one that asks for a full name. In comparison, two fields that belong to different sections (e.g., personal information and hobby section) and that are of different types (e.g., one being a text field and the other being a radio field) are found to have a low degree of association. The computing system maps these two fields to two respective input requests.

In addition to, or as part of, computing the workflow identifying the sequence of user interactions and determining individual requests, the technique of FIG. 5 further involves determining possible predicted answer choices to the individual requests based on the user profile, user circumstances, or information about other users, as shown in block 506. In one embodiment, this involves predicting suggested user interactions with an electronic form based on electronic form state (e.g., available to the user, already downloaded, active, inactive, partially populated, having particular field populated, validated, exported, etc.), user information from the user profile data repository 124, the user's circumstances (e.g., driving, exercising, at work, at home, with family, etc.), information about other users such as other user actions and responses, and/or information about the particular electronic form, such as an associated submission deadline and submission upload parameters. Additionally or alternatively, prediction parameters can include a history of the user and/or of other users filling out copies of the electronic form or of other electronic forms and a profile of the user. In an illustration, if the user has previously filled out a copy of the electronic form, the computing system predicts the user response from the respective populated field of the copy. In another illustration, if the user has filled out other electronic forms, the computing system looks up a similar field in the other electronic forms. A similar field includes, for example, a populated field that has the same label, descriptive texts, type, etc., as the field of the current electronic form. The computing system predicts the user response from this populated field. Similar predictions are also made based on other users. In particular, another user (or a group of other users) can be selected for the prediction based on a common attribute with the user. The attribute can relate to the field. For instance, if the field is about a salary, the other user is selected as one having a same occupation as the user. In a further illustration, the user can have a profile at an application hosted on the computing system (e.g., with a form analysis tool) or on the client (e.g., with a form workflow assistant or more generic to the client itself). The profile includes personal information that is usable for the prediction. For example, if the field is about the name of the user, such information is predicted from the profile.

The technique of FIG. 5 further involves guiding user interactions according to the form workflow, as shown in block 508. In one embodiment, the input requests are presented one at a time at the client. In one example, guiding the user interactions involves iteratively requesting user interactions using the individual requests and possible predicted answer choices and receiving responses to select, populate, or export the electronic form. The guided user interactions are interactive in that the computing system receives a user response from the client in response to an input request presented at the client. Each user response is used to identify and present a next input request. Some of the sequence of guided user interactions facilitate population of the forms of the field, in one embodiment. Input requests related to populating form fields are formulated based on the type of the field(s). For example, if the field is a radio field, the input request lists the selectable options. In comparison, if the field is a text field, the input request allows a freeform text input. Each user response is parsed and data from the user response is used to populate the field(s) corresponding to the input request.

In one embodiment, the workflow organizes the presentation of the input requests in a dynamic order that depends on the desired use or uses of the electronic form, form completion deadlines, user preferences, a flow of the electronic form, the user responses, and other appropriate information. For example, if the user has not previously filled out a portion of the electronic form, the computing system selects the first state from the state machine and identifies the corresponding input request as the one to be presented. On the other hand, if some portion was previously filled out, the computing system identifies the last used state, the last user response, selects the next state based on the state machine, and identifies the input request corresponding to the next state. In addition, if the user requests a specific field to be filled out, the computing system identifies the input request corresponding to that field.

In one example, the computing system generates a state machine from the workflow. With respect to use of the document, different states of use (not downloaded, downloaded, selected, to-be-completed-by deadline, etc.) are associated with the states of the state machine. With respect to populating form fields, the fields (or, conversely, the corresponding input requests) are also mapped to the states of the state machine. The transitions between the states can be determined based on anticipated processes, the fields of the electronic form, the structure, instructions or metadata of the electronic form, and/or using information detected from the layout of the different fields within the electronic form (e.g., relative locations to each other, types of the fields, what sections the fields belong to, etc.) and from the subject matter of the descriptive texts (e.g., whether filling out one field depends on filling out another field).

The mapping can use different techniques. In one example technique, the mapping matches the type of a field to the type of an element. For instance, if the input request asks for a name and a Social Security number, the alphabetic characters are snatched to a name field and the numeric characters are matched to a Social Security number field. In another example technique, the mapping matches a subject matter of a field to the subject matter of an element. For instance, if the input request asks for a name and a birth month, the elements are compared to the months of the year. An element that matches a month is inputted to the birth month field. The remaining element(s) are inputted to the name field. In yet another example technique, the matching uses an order of the elements. For instance, the input request asks the user to state his or her first name followed by the last name. As such, the first element and the second element from the user response are inputted to the first name field and the second name field, respectively.

The guided user interactions for populating form fields are based on the type of the field. For example, the computing system formulates the input request to solicit a user response that is proper for the type of the field. In an illustration, if the field is a radio field, the input request is set to present the selectable options and to ask the user to choose one of these options. If a field is a text field, the input request is set to ask for an alphanumeric entry that accepts a freeform input from the user. If a field is a comb field, the input request is set to allow entries in a single user response to the sub-fields forming the comb field. If a field is a checkbox field, the input request is set to present the checkable options and to ask the user to check the proper ones. If a field is a signature field, the input request is set to present any disclaimer and to ask the user to type in a name, say a name, or use a biometric signature (e.g. a finger print, a retinal scan, a face recognition).

In one embodiment, the guided interactions use possible predicted answer choices. A determination is made as to whether a prediction associated with the field exists. In an example, the prediction includes a potential response, or set of potential responses. For example, the computing system includes the prediction in the input request. As such, each input request includes information about the prediction in addition to the label and descriptive text of the field. In that way, the user need not be requested to provide much information in the user response, thereby easing the user's effort. Instead, the user is asked to confirm or select from the prediction.

Generally, there are different types of prediction for populating form fields. One example type corresponds to an automatic fill mode. In this mode, the top candidate prediction is selected and presented to the user. That can be the case when there is sufficient separation in confidence between the top choice and the alternatives. If the user rejects the top candidate, the user is asked to provide the necessary information in the response to fill out the electronic form or, alternatively, the next top candidate is presented to the user (e.g., as an in a smart fill mode). Another example type corresponds to the smart fill mode. In this mode, the predictions are ranked and are presented as choices to the user based on the ranking. The user responds by selecting one of the choices.

Generally, there are distinct possibilities of the potential user response used to populate form fields. These possibilities include, for example, (1) no potential clues to the answer are known, (2) there is a single guided suggestion which exists, (3) there are a well-defined set of guided possibilities, and (4) there is a set of guided possibilities which may or may not be used in the response. In the first possibility, there is no information based on the user's profile or past history of entering form data due to either lack of prior knowledge or prevention of doing so based on security concerns (e.g., four digits on back of credit card). This leads to soliciting a "free-form" response. The field of the electronic form is populated by interpreting the user's response. In the second possibility, a single response to a field (e.g. date of birth) could have been stored. The user is presented with confirmation of the expected response. If the user rejects the expected response, again a "free-form" response is used. In the third possibility, a radio field can provide several choices, one of which should be selected (e.g., Gender: 'male' or 'female'); a pull-down Held with several pre-populated options also follows this model. By the very nature of such fields, the possibility of a free-form response is precluded. Instead, the different options are presented to the user with a request to select one of these options. In the fourth possibility, a text field could have produced more than one answer in the past but does not necessarily preclude a new and unique answer. In this case, the various answers (past and potential future answers) are presented to the user for a selection (e.g., "I see have used two contact answers in the past "800-555-1234" and "888-555-0000; which is the best contact number or do you prefer a new contact number?").

In one embodiment, the computing system also validates the user response. If a user response to make a selection is invalid, the computing system retries or reformulates the request. If a user response to populate a field is invalid, the field is not populated. Instead, the input request is presented again to the user or reformulated. The computing system uses different validation techniques. Some of the validation techniques can be similar to the above mapping techniques. For example, the validation techniques use the types, subject matters, and/or orders of the field(s) and the element(s) of the user response. If the field type and the element type do not match, the user response is invalid. Similarly, if there is a subject matter mismatch, the user response is invalid. Likewise, if the input request asks for a particular number of elements but the user responses includes a different number, the difference indicates an order mismatch and, thus, the user response is invalid.

FIG. 6 is another flow chart illustrating another exemplary technique for assisting a user with use of an electronic form by guiding user interactions in a conversational manner.

The technique of FIG. 6 involves determining a modality of interacting with the user based on the user device, user profile, or a user request, as shown in block 602. With respect to user device, the computer system identifies that the user is using a device with particular characteristics, such as a small screen, no keyboard, no mouse, etc., and determined a touch-free or other appropriate modality. Conversely, the computer system determines that the user device is (or is switched to) one with more capabilities, a touch-based or other appropriate modality is determined.

With respect to a user, the system analyzes the user profile or other information provided by the user to determine an appropriate modality. For example, if the computer system identifies that the user is visually or manually impaired, a touch-free modality is determined. As another example, if the computer system determines that the user is cognitively impaired, the system can select an appropriate modality. In one specific example, the computer system determines to provide a workflow with a level of guidance (e.g., minimal guidance, medium guidance, or maximum guidance) based on the user. A user with a significant cognitive impairment who has trouble understanding complicated concepts or multi-faceted instructions can receive maximum guidance, with more instructions and with complicated instructions broken down into smaller, easier pieces.

With respect to a user request, the modality can be determined based on a specific user request. In one example, a user driving a car while using a form on a cell phone may manually select a hands-free device or may have specified a user preference that the modality should be hands-free when driving. In this example, the system automatically detects that the user is driving based on detecting change in location of the electronic device, infers that the user is driving, and selects the hands-free modality accordingly.

The technique of FIG. 6 further involves computing a workflow identifying a sequence of user interactions, as shown in block 604, determining individual requests requesting user interactions of the workflow based on identifying fields of the electronic form using form field recognition, as shown in block 506, and determines possible predicted answer choices to the individual requests based on the user profile or information about other users, as shown in block 508. These steps correspond to steps 402, 404, and 406 of FIG. 4, respectfully and involve similar features.

The technique of FIG. 6 guides interactions in block 610, 612, 614. In block 610, the technique involves guiding user interactions to select the electronic form to populate based on a state of the electronic form or based on user circumstances. In one example, this involves presenting a user with an option to select a desired form to populate based on form options. The form options, in one example, are identified by compiling forms received by the user in an e-mail or other electronic account. In another example, the form options are identified based on receiving a request from the user to find a form (e.g., a user request to sign up for little league baseball at a particular facility). In the example, if there are different forms for signing up for the little league baseball, the user is asked to select an appropriate form and guidance is provided to allow the user to distinguish the forms from one another. The current state of the user, i.e., the user's circumstances, are additionally or alternatively used in one embodiment of the invention. For example, the user's location, proximity to the device, current activity (e.g., driving, traveling, etc.), time of day. Such information, in one embodiment of the invention, is included in the user profile. In this example, the user profile is frequently updated to identity the user's circumstances.

In block 612, the technique involves guiding the user interactions to populate fields of the electronic form by iteratively querying and receiving responses for fields according to the workflow. The guided interactions, in one embodiment, use possible predicted answer choices to facilitate appropriate, easy, and fast selections by the user.

In block 614, the technique involves guiding the user interactions to export the electronic form based on a state of the electronic form. In one embodiment the state of the electronic form indicates that the form is complete and the user is guided to upload the form to an appropriate recipient server In another example, the state of the form indicates that the form is complete and associated with a deadline that is approaching, and the user interactions guide the uses to print the electronic form, print an envelope with a label addressed to an appropriate recipient, and provides instructions for the user to mail the form by the deadline.

In one embodiment, guiding the user interactions involves providing audible requests, and the responses comprise voice responses interpreted using voice recognition or selection from graphic representations of the possible predicted answer choices. In another embodiment, guiding the user interactions uses both a visual modality and an audio modality.

In one embodiment, the computer system guides the user interactions using a pre-computed workflow that is stored with or separate from the electronic form. In an alternative embodiment, the workflow is computed while guiding the user interactions.

In one embodiment, guiding the user interactions comprises requesting a biometric identification, receiving the biometric identification, and populating the signature field with an electronic signature baaed on confirming the authenticity of the biometric identification. In one example, this involves requesting that the user press a thumb or other finger on a fingerprint leading mechanism, capturing an image of the fingerprint, sending the image to an authentication server, receiving an indication of authentication or an authenticated electronic signature, and signing the electronic form with an authenticated electronic signature. Biometric information, in another embodiment, is additionally or alternatively used to confirm the identity of the user prior to accessing a user profile to, for example, predict user responses based on user information.

Figure 7:
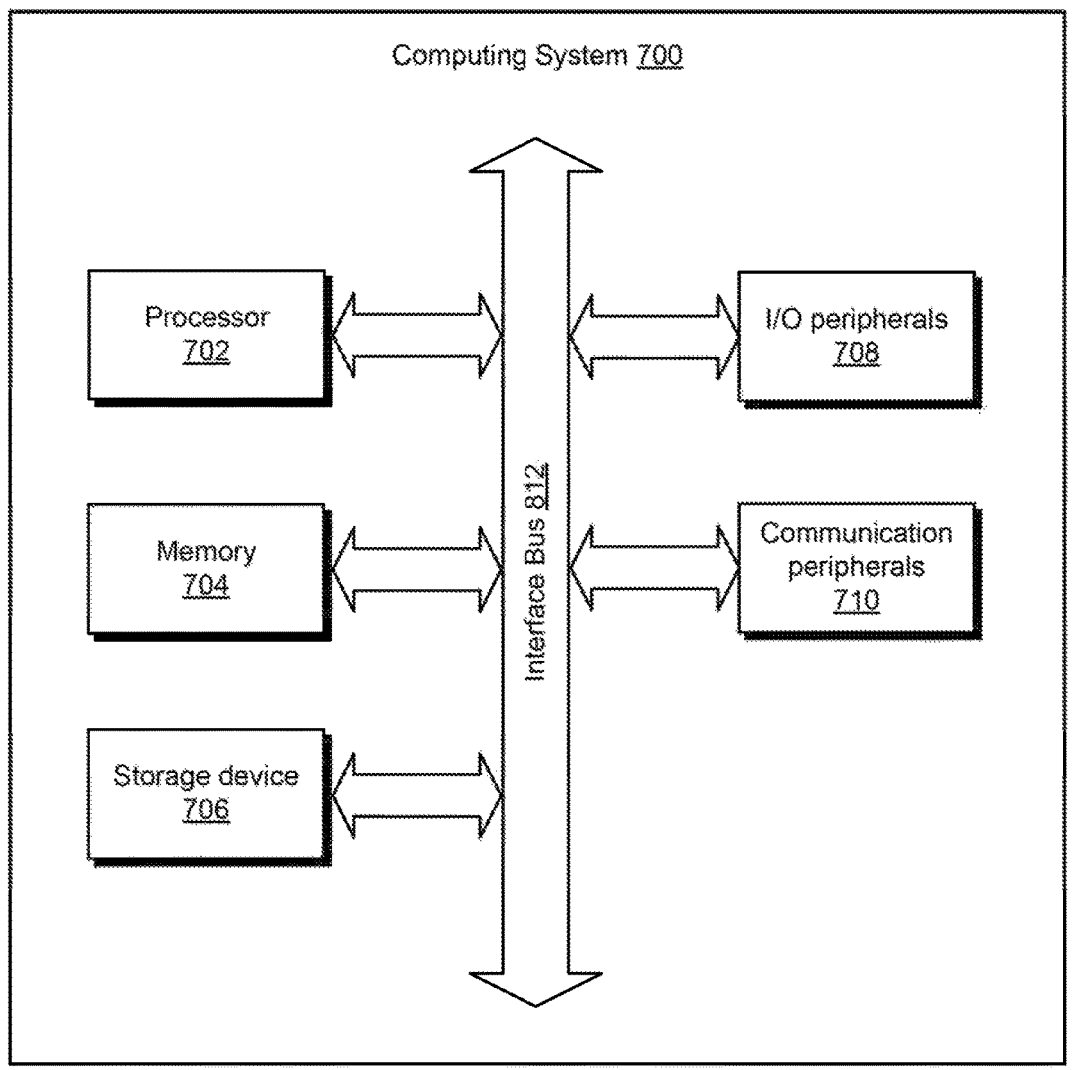
FIG. 7 illustrates example components of a computing system, according to certain embodiments of the present invention.

Turning to FIG. 7, the figure illustrates example components for implementing some or all of the components of the server 120 and/or the client 110 of FIG. 1. Although the components are illustrated as belonging to a same computing system 700, this system can be distributed.

The computing system 700 includes at least a processor 702, a memory 704, a storage device 706, input/output peripherals 708, communication peripherals 710, and an interface bus 712. The interface bus 712 is configured to communicate, transmit, and transfer data, controls, and commands among the various components of the computing system 700. The memory 604 and the storage device 706 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 704 and the storage device 706 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 700.

Further, the memory 704 includes an operating system, programs, and applications. The processor 702 is configured to execute the stored instructions and includes, for example, a logical processing unit, a microprocessor, a digital signal processor, and other processors. The memory 704 and/or the processor 702 can be virtualized and can be hosted within another computing system of, for example, a cloud network or a datacenter. The input and output peripherals 708 includes user interfaces such as a keyboard, screen, microphone, speaker, other input/output devices, and computing components such as graphical processing units, serial ports, parallel ports, universal serial bus, and other input/output peripherals. The input/output peripherals 708 are connected to the processor 702 through any of the ports coupled to the interface bus 712. The communication peripherals 710 are configured to facilitate communication between the computing system 700 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method performed by a processor and comprising:
    downloading or obtaining, by a workflow assistant, an electronic form;
    identifying, by the workflow assistant, a workflow identifying a sequence of user interactions to complete the electronic form, wherein identifying the workflow comprises developing, based on fields in the electronic form, requests for content of fields and possible predicted answer choices for the content of the fields;
    identifying, by the workflow assistant, an attribute of one or more of (i) a user device for conducting the sequence of the user interactions or (ii) a user associated with the user device;
    determining, by the workflow assistant and from the attribute, a reduced capability to obtain input into the fields of the electronic form when the electronic form is presented, as downloaded, at the user device as compared to a capability existing in the absence of the attribute;
    selecting, by the workflow assistant and based on the reduced capability being determined, a touch-free modality for the workflow;
    executing, by the workflow assistant, the workflow in the selected touch-free modality to conduct the user interactions to obtain the content for the fields of the electronic form to complete the electronic form; and
    for one of the requests, completing, by the workflow assistant, a corresponding one of the user interactions by performing, within the selected touch-free modality, operations comprising:
        configuring the user device to present a set of candidate responses to the one of the requests, the set of candidate responses selected from the possible predicted answer choices, and
        restricting, based on determining the reduced capability, possible responsive input to a selection of a candidate response from the set of candidate responses.

2. The method of claim 1, wherein developing the requests for content of fields comprises at least one of:
    identifying fields of the electronic form using form field recognition, or
    identifying a user characteristic in a user profile corresponding to an identified field of the electronic form.

3. The method of claim 1, wherein executing the workflow to conduct the user interactions to obtain the content for the fields comprises guiding user interactions according to the workflow to populate the fields of the electronic form, wherein guiding the user interactions to populate the fields comprises iteratively requesting user interactions using the requests for content and the possible predicted answer choices and receiving responses to the requests.

4. The method of claim 3, wherein conducting the user interactions comprises providing audible prompts for input, and wherein the responses comprise voice responses to the audible prompts, the voice responses interpreted using voice recognition or selection from graphic representations of the possible predicted answer choices.

5. The method of claim 1 further comprising guiding, by the workflow assistant, user interactions to select the electronic form to complete.

6. The method of claim 1 further comprising guiding, by the workflow assistant, user interactions to select the electronic form to complete based on a state of the electronic form or user circumstances.

7. The method of claim 1 further comprising guiding, by the workflow assistant, user interactions to export the electronic form based on a state of the electronic form indicating that the electronic form is completed or user circumstances, wherein exporting the electronic form comprises printing, electronic sharing, saving, messaging, providing a notification, or e-mailing the electronic form.

8. The method of claim 1, wherein the touch-free modality provides audible prompts for input and interprets voice responses to the audible prompts using voice recognition.

9. The method of claim 8, wherein the touch-free modality is determined based on the user device not providing an appropriate type of input device.

10. The method of claim 8, wherein a modality used for the user interactions is determined based on a user characteristic in a user profile indicating that the user of the user device has a visual, manual, or cognitive disability or user circumstances.

11. The method of claim 1, wherein the user interactions use a Braille-based, hand gesture-based, video recognition-based, eye gaze-based, switch control-based, or electroencephalogram (EEG) analysis-based input modality.

12. The method of claim 1, wherein the workflow identifies contingent user interactions, wherein a next user interaction of a contingent user interaction is based on a user response to a prior user interaction request.

13. The method of claim 1, wherein the workflow assistant guides the user to skip population of a field or section of the electronic form by omitting, from requests that are outputted via the user device, requests prompting the user to provide input for the field or section, wherein the omitting is performed based on (i) a prior response from the user populating a field of electronic form with a particular response and (ii) instructions of the electronic form.

14. The method of claim 1, wherein the workflow is pre-computed and stored with the electronic form.

15. The method of claim 1, further comprising the workflow assistant:
requesting a biometric identification;
receiving the biometric identification; and
based on confirming that the biometric identification is authentic, accessing user profile information or populating a signature field with an electronic signature.

16. The method of claim 1, wherein developing the requests for the content of fields comprises:
identifying a group of related fields in the electronic form;
outputting a single request for a user response providing data for the group of related fields; and
parsing the user response, received responsive to the single request, into multiple data elements for respective input into the related fields.

17. A system comprising:
a processor;
a non-transitory computer readable medium storing instructions, wherein, when executed by the processor, the instructions perform operations comprising:
downloading or obtaining, by a workflow assistant, an electronic form;
identifying, by the workflow assistant, a workflow identifying a sequence of user interactions to complete the electronic form, wherein identifying the workflow comprises developing, based on fields in the electronic form, requests for content of fields and possible predicted answer choices for the content of the fields,
identifying, by the workflow assistant, an attribute of one or more of (i) a user device for conducting the sequence of the user interactions or (ii) a user associated with the user device,
determining, by the workflow assistant and from the attribute, a reduced capability to obtain input into the fields of the electronic form when the electronic form is presented, as downloaded, at the user device as compared to a capability existing in the absence of the attribute,
selecting, by the workflow assistant and based on the reduced capability being determined, a touch-free modality for the workflow;
executing, by the workflow assistant, the workflow in the selected touch-free modality to conduct the user interactions to obtain the content for the fields of the electronic form to complete the electronic form, and
for one of the requests, completing, by the workflow assistant, a corresponding one of the user interactions by:
configuring the user device to present a set of candidate responses to the one of the requests, the set of candidate responses selected from the possible predicted answer choices, and
restricting, based on determining the reduced capability, possible responsive input to a selection of a candidate response from the set of candidate responses.

18. The system of claim 17 further comprising a data repository storing a user profile that identifies a visual, manual, or cognitive disability of the user, wherein determining the reduced capability is based on identifying the visual, manual, or cognitive disability from the data repository.

19. A non-transitory computer-readable medium comprising instructions, wherein the instructions, when executed by one or more processing devices, cause the one or more processing devices to perform operations comprising:
downloading or obtaining, by a workflow assistant, an electronic form;
identifying, by the workflow assistant, a workflow identifying a sequence of user interactions to complete the electronic form, wherein identifying the workflow comprises developing, based on fields in the electronic form, requests for content of the fields and possible predicted answer choices for the content of the fields,
identifying, by the workflow assistant, an attribute of one or more of (i) a user device for conducting the sequence of the user interactions or (ii) a user associated with the user device;
determining, by the workflow assistant and from the attribute, a reduced capability to obtain input into the fields of the electronic form when the electronic form is presented, as downloaded, at the user device as compared to a capability existing in the absence of the attribute;
selecting, based on the reduced capability being determined, a touch-free modality for the workflow;
executing, by the workflow assistant, the workflow in the selected touch-free modality to conduct the user interactions to obtain the content for the fields of the electronic form to complete the electronic form; and
for one of the requests, completing, by the workflow assistant, a corresponding one of the user interactions by performing, within the selected touch-free modality, additional operations comprising:
configuring the user device to present a set of candidate responses to the one of the requests, the set of candidate responses selected from the possible predicted answer choices, and
restricting, based on determining the reduced capability, possible responsive input to a selection of a candidate response from the set of candidate responses.

20. The non-transitory computer-readable medium of claim 19, wherein developing the requests for the content of fields comprises:
identifying a group of related fields in the electronic form,
outputting a single request for a user response providing data for the group of related fields; and
parsing the user response, received responsive to the single request, into multiple data elements for respective input into the related fields.

* * * * *